(12) United States Patent
Gaertner et al.

(10) Patent No.: US 9,424,756 B2
(45) Date of Patent: Aug. 23, 2016

(54) VISUAL FLIGHT RULES APPROACH TO AIRPORTS

(71) Applicant: The Boeing Company, Chicago, IL (US)

(72) Inventors: Marco Gaertner, Sinntal-Sannerz (DE); Andre Lutz, Erzhausen (DE)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/027,195

(22) Filed: Sep. 14, 2013

(65) Prior Publication Data

US 2015/0081197 A1 Mar. 19, 2015

(51) Int. Cl.
*G08G 5/02* (2006.01)
*G01C 23/00* (2006.01)
*G08G 5/00* (2006.01)

(52) U.S. Cl.
CPC ............... *G08G 5/02* (2013.01); *G01C 23/005* (2013.01); *G08G 5/0021* (2013.01); *G08G 5/0039* (2013.01); *G08G 5/025* (2013.01)

(58) Field of Classification Search
None
See application file for complete search history.

(56) References Cited

U.S. PATENT DOCUMENTS

| 3,577,120 | A | * | 5/1971 | Sherbert, Jr. | G01C 21/00 340/971 |
| 4,827,419 | A | * | 5/1989 | Selby, III | 701/528 |
| 6,112,141 | A | | 8/2000 | Briffe et al. | |
| 6,389,333 | B1 | * | 5/2002 | Hansman et al. | 701/3 |
| 7,742,847 | B2 | * | 6/2010 | DeMers et al. | 701/14 |
| 7,908,082 | B2 | * | 3/2011 | Clark et al. | 701/457 |
| 8,055,395 | B1 | * | 11/2011 | Dirks et al. | 701/16 |
| 8,515,597 | B2 | * | 8/2013 | McDowell et al. | 701/3 |
| 8,694,184 | B1 | * | 4/2014 | Boorman et al. | 340/973 |
| 8,774,989 | B1 | * | 7/2014 | Bush et al. | 701/14 |
| 2004/0044446 | A1 | * | 3/2004 | Staggs | 701/16 |
| 2004/0246178 | A1 | * | 12/2004 | Smith | 342/454 |
| 2006/0031006 | A1 | * | 2/2006 | Stenbock et al. | 701/200 |
| 2007/0129857 | A1 | * | 6/2007 | Fortier | G08G 5/0039 701/16 |
| 2007/0138345 | A1 | * | 6/2007 | Shuster | 244/186 |
| 2007/0225876 | A1 | * | 9/2007 | Caillaud et al. | 701/16 |
| 2008/0039988 | A1 | * | 2/2008 | Estabrook | B64C 13/18 701/14 |
| 2008/0103645 | A1 | * | 5/2008 | DeMers et al. | 701/14 |
| 2008/0165183 | A1 | * | 7/2008 | Rassieur et al. | 345/419 |
| 2008/0183344 | A1 | * | 7/2008 | Doyen et al. | 701/9 |
| 2009/0093953 | A1 | | 4/2009 | Wiesemann et al. | |

(Continued)

FOREIGN PATENT DOCUMENTS

| EP | 1852683 A2 | 11/2007 |
| EP | 2199747 A2 | 6/2010 |
| EP | 2400273 A2 | 12/2011 |

OTHER PUBLICATIONS

ForeFlight, Inc. Pilot's Guide to ForeFlight Mobile. 10th edition. Accessed via archive.org on Apr. 3, 2014. Archived on Aug. 16, 2012.*

(Continued)

*Primary Examiner* — Rami Khatib
*Assistant Examiner* — Jeffrey Boomer
(74) *Attorney, Agent, or Firm* — Toler Law Group, PC

(57) ABSTRACT

A method includes receiving visual flight rules (VFR) data and determining a suggested path of approach for an aircraft based on the VFR data. The suggested path of approach may correspond to a flight path of the aircraft to a runway of an airport. The method includes highlighting a representation of the suggested path of approach at a display device.

20 Claims, 10 Drawing Sheets

(56) References Cited

U.S. PATENT DOCUMENTS

| | | | |
|---|---|---|---|
| 2009/0150012 A1* | 6/2009 | Agam et al. | 701/3 |
| 2009/0248224 A1* | 10/2009 | Tschannen | 701/3 |
| 2010/0036552 A1* | 2/2010 | Pepitone et al. | 701/18 |
| 2010/0217461 A1* | 8/2010 | Ledesma et al. | 701/18 |
| 2011/0084106 A1* | 4/2011 | Bopp et al. | 224/563 |
| 2011/0118912 A1* | 5/2011 | Shuster | 701/18 |
| 2011/0144832 A1* | 6/2011 | McDowell | G08G 5/0043 701/3 |
| 2011/0184595 A1* | 7/2011 | Albert et al. | 701/16 |
| 2012/0035849 A1 | 2/2012 | Clark et al. | |
| 2012/0218127 A1* | 8/2012 | Kroen | G01W 1/02 340/945 |
| 2012/0232725 A1* | 9/2012 | Dumoulin et al. | 701/18 |
| 2013/0027226 A1* | 1/2013 | Cabos | 340/961 |
| 2013/0035848 A1* | 2/2013 | Burgin et al. | 701/415 |
| 2013/0046422 A1* | 2/2013 | Cabos | 701/3 |
| 2013/0197791 A1* | 8/2013 | Struzik | 701/123 |
| 2013/0226452 A1* | 8/2013 | Watts | G08G 5/0091 701/528 |

OTHER PUBLICATIONS

Federal Aviation Administration. AeroNav Products Aeronautical Chart User's Guide 10th edition. Jan. 2012.*
National Aeronautics and Space Administration, Relative Velocities, Glenn Research Center, Archived by archive.org on Feb. 13, 2012.*
SkyDemon. "SkyDemon Mobile Documentation: Warnings and Navigation Aids." Archived by archive.org on Oct. 15, 2012. Accessed on Jul. 24, 2015.*
International Search Report and Written Opinion for International Application No. PCT/US/2014/043371, ISA/EPO, Date of Mailing Oct. 27, 2014, 13 pages.

* cited by examiner

VISUAL FLIGHT RULES APPROACH TO AIRPORTS

FIELD OF THE DISCLOSURE

The present disclosure is generally related to a visual flight rules (VFR) navigation system.

BACKGROUND

Aviation regulatory agencies, such as the federal aviation administration (FAA), have established visual flight rules (VFR) that enable a pilot to navigate an aircraft under certain weather and visibility conditions. When navigating an aircraft under VFR, the pilot may navigate from a point of origin to a destination using the ground as a reference. The weather and visibility conditions under which VFR navigation is permitted for a particular classification of airspace (e.g., a class B airspace) are determined by the appropriate aviation regulatory agency (e.g., the FAA in the United States) that governs the particular airspace and are designed to enable the pilot to see obstructions and other aircraft that may be present in the airspace.

A pilot navigating an aircraft under VFR may use one or more aeronautical navigation charts to aid in navigation of the aircraft from a first airport located at the point of origin to a second airport located at the destination. The one or more aeronautical navigation charts may include an aeronautical navigation chart associated with an airspace surrounding the second airport located at the destination. The aeronautical navigation chart may include representations of multiple paths of approach to a runway of the second airport and representations of multiple VFR flight routes into and through the airspace surrounding the second airport. The aeronautical navigation charts may also include representations of topographical features (e.g., mountains, rivers, and other identifiable features visible from the air) and obstructions (e.g., towers) present in the airspace in which the aircraft is travelling that the pilot may use as reference points to navigate the aircraft along a particular VFR flight route or path of approach. The representations of the multiple paths of approach, the multiple VFR flight routes, and the topographical features and obstructions may cause the aeronautical navigation chart to appear cluttered and make it difficult for the pilot to locate topographical features that may be used to maintain the aircraft along the desired path of approach to the runway of the second airport.

SUMMARY

Disclosed herein are embodiments of a visual flight rules (VFR) navigation system configured to determine a suggested path of approach to a runway of an airport (e.g., a destination airport) for an aircraft navigating under VFR and to dynamically display a representation of the suggested path of approach at a display device. The VFR navigation system may be configured to dynamically determine the suggested path of approach to the runway of the airport based on a flight plan of the aircraft, navigation information received from sensors (e.g., wind sensors, altitude sensors, etc.) located on the aircraft, systems external to the aircraft (e.g., a notice to airmen (NOTAM) system, a transmitter associated with the airport, a weather system associated with the airport, an automatic terminal information service (ATIS), a digital ATIS, etc.), aeronautical navigation information (e.g., a terminal area chart associated with the destination airport) stored in a memory (e.g., a hard-disk drive, a random access memory, a read only memory, etc.) of the VFR navigation system, other sensors or systems (e.g., sensors or systems associated with a national or regional weather service), or a combination of these sources of information. In a particular embodiment, the VFR navigation system may be configured to highlight the representation of the suggested path of approach at the display device to visually distinguish the representation of the suggested path of approach from representations of other paths of approach included in aeronautical navigation information displayed at the display device. In another embodiment, the VFR navigation system may be configured to remove the representations of the other paths of approach such that only the representation of the suggested path of approach is included in the aeronautical navigation information displayed at the display device.

A VFR navigation system according to one or more of the embodiments described herein may simplify navigation of an aircraft under VFR by automatically determining the suggested path of approach to be used by the pilot when navigating an aircraft to a runway of an airport and by highlighting (or otherwise emphasizing) a representation of the suggested path of approach included in aeronautical navigation information presented or displayed at a display device. Highlighting the representation of the suggested path of approach may enable the pilot to more quickly locate the suggested path of approach from among multiple paths of approach represented by the aeronautical navigation information and may enable the pilot to more quickly locate topographical features and obstructions that may be used as reference points when navigating the aircraft along the suggested path of approach. Furthermore, the representation of the suggested path of approach may be graphical, textual, or both. A graphical representation of the suggested path of approach may improve situational awareness and may reduce a risk of pilot error. Thus, a VFR navigation system according to one or more of the embodiments disclosed herein enables a pilot to more easily navigate the aircraft to the runway of the airport under VFR.

In a particular embodiment, a method includes receiving visual flight rules (VFR) data at an electronic device. The method includes determining a suggested path of approach for an aircraft based on the VFR data. The suggested path of approach corresponds to a flight path of the aircraft to a runway of an airport. The method includes highlighting (or otherwise emphasizing) a representation of the suggested path of approach at a display of the electronic device.

In another embodiment, an apparatus includes a processor and a memory coupled to the processor. The memory stores instructions that, when executed by the processor, cause the processor to receive visual flight rules (VFR) data. The memory stores instructions that, when executed by the processor, cause the processor to determine a suggested path of approach for an aircraft based on the VFR data. The suggested path of approach corresponds to a flight path of the aircraft to a runway of an airport. The memory stores instructions that, when executed by the processor, cause the processor to highlight (or otherwise emphasize) a representation of the suggested path of approach on a display device communicatively coupled to the processor.

In another embodiment, a computer-readable storage device includes instructions that, when executed by a processor, cause the processor to receive visual flight rules (VFR) data. The computer-readable storage device includes instructions that, when executed by the processor, cause the processor to determine a suggested path of approach for an aircraft based on the VFR data. The suggested path of approach corresponds to a flight path of the aircraft to a runway of an airport. The computer-readable storage device includes instructions that, when executed by the processor, cause the processor to highlight (or otherwise emphasize) a representation of the suggested path of approach on a display device communicatively coupled to the processor.

DETAILED DESCRIPTION

Figure 1:
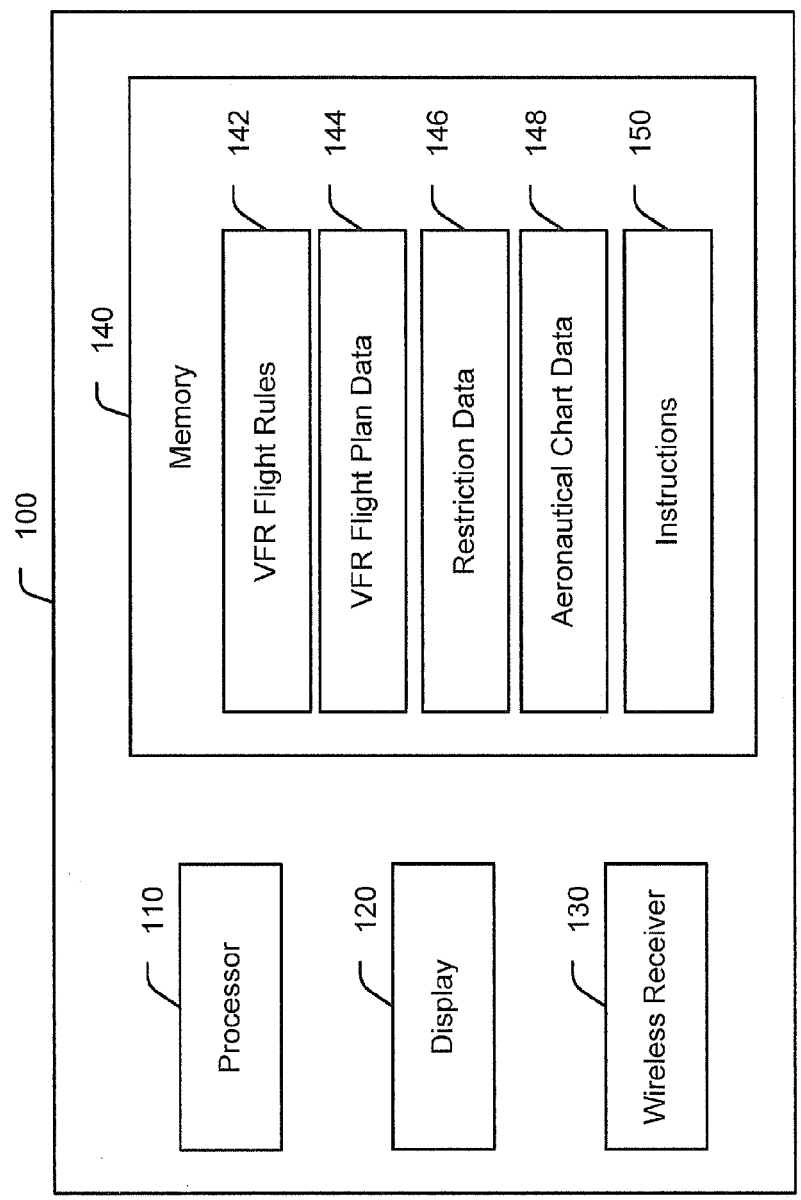
FIG. 1 is a block diagram of an illustrative embodiment of an electronic device configured to perform visual flight rules (VFR) navigation operations for an aircraft operating under VFR.

Referring to FIG. 1, a block diagram of an illustrative embodiment of an electronic device configured to perform visual flight rules (VFR) navigation operations for an aircraft operating under VFR is shown and designated 100. As shown in FIG. 1, the electronic device 100 includes a processor 110, a display device 120, a wireless receiver 130, and a memory 140. In a particular embodiment, the electronic device 100 may be a portable device such as an electronic flight bag device or a tablet computer, configured for use as an aeronautical navigation device by a pilot when navigating an aircraft under VFR. In another embodiment, the electronic device 100 may be integrated with a control panel of the aircraft (e.g., an onboard navigational system). In a particular embodiment, the display device 120 may be separate from the electronic device 100. For example, the electronic device 100 may be a flight control computer or an onboard navigation computer of the aircraft and the display device 120 may be integrated within a control panel of the aircraft. The display device 120 may be coupled to the electronic device 100 (e.g., the flight control computer or the onboard navigation computer) and may be configured to display aeronautical navigation information. The memory 140 may store one or more visual flight rules (VFR) 142, VFR flight plan data 144, restriction data 146, aeronautical chart data 148, and instructions 150. The instructions 150 may include instructions that, when executed by the processor 110, cause the processor 110 to perform aeronautical navigation operations according to the various embodiments described with reference to FIGS. 1-8.

The one or more VFR flight rules 142 may include information associated with navigation restrictions or rules imposed on an aircraft navigating under VFR. The VFR flight rules 142 may include information that identifies a minimum visibility required for a pilot to navigate the aircraft under VFR within an airspace. The VFR flight rules 142 may also include information that indicates a cruising altitude to be used by the pilot when navigating the aircraft within a particular airspace under VFR and information that identifies a minimum separation distance (e.g., a vertical separation distance and/or a horizontal separation distance) that the pilot must maintain between the aircraft and environmental elements (e.g., clouds, the ground, etc.) when navigating the aircraft under VFR within the particular airspace.

The VFR flight plan data 144 may include information indicating one or more VFR flight routes that the pilot intends to use to navigate the aircraft under VFR from a first airport associated with a point of origin to a second airport associated with a destination. In a particular embodiment, the VFR flight plan data 144 may include information associated with a suggested path of approach that the pilot intends to use to land at a runway of the second airport. The intended path of approach may be determined by the pilot prior to departing the first airport based on information associated with the second airport. The information associated with the second airport may be available to the pilot prior to departing from the first airport (e.g., via an aeronautical navigation information service that provides information regarding the second airport, or another information source) and may indicate a current wind speed, a current wind direction, an active runway, and other environmental information associated with the second airport. The pilot may use an interface to store the VFR flight plan data 144 at the memory 140. For example, the display device 120 may be a touch screen device and the pilot may access one or more aeronautical navigation charts from the aeronautical chart data 148 to generate the VFR flight plan data 144. Additionally, the VFR flight plan data 144 may include flight plans associated with previous flights, and the pilot may use a previously created flight plan for a subsequent flight.

The restriction data 146 may include information that identifies one or more airspaces where the pilot is not permitted to navigate the aircraft. For example, the restriction data 146 may include information that identifies a first airspace in which navigation of an aircraft under VFR is not permitted (e.g., an airspace restricted to instrument flight rules (IFR) navigation). As another example, the restriction data 146 may include information that identifies a second airspace in which navigation of certain aircraft is not permitted (e.g., an airspace or a portion of an airspace that is reserved for military use).

In an embodiment, the electronic device 100 may be configured to access the restriction data 146 to determine whether the aircraft is approaching or has entered a restricted airspace. The electronic device 100 may be configured to generate an alert (e.g., an audible alert, a visual alert, or both) indicating that the aircraft is approaching or has entered a restricted airspace. The electronic device 100 may be configured to determine whether the aircraft is approaching or has entered the restricted airspace based at least in part on the aeronautical chart data 148, based on a current heading and location of the aircraft (e.g., information received from a global positioning system (GPS) or another positioning system accessible to or included in the electronic device 100).

The aeronautical chart data 148 may include information associated with one or more aeronautical navigation charts. For example, the aeronautical chart data 148 may include a first aeronautical navigation chart corresponding to an airspace surrounding the first airport, a second aeronautical navigation chart corresponding to an airspace surrounding the second airport, and one or more additional aeronautical navigation charts corresponding to airspaces between the first airport and the second airport. The first aeronautical navigation chart may include information associated with VFR flight routes within an airspace surrounding the first airport and VFR paths of approach to a runway of the first airport. The second aeronautical navigation chart may include information associated with VFR flight routes within an airspace surrounding the second airport and VFR paths of approach to a runway of the second airport. The one or more additional aeronautical navigation charts may include information associated with VFR flight routes between the airspace surrounding the first airport and the airspace surrounding the second airport. The aeronautical chart data 148 may include information that identifies a classification of each airspace included in a particular aeronautical chart (e.g., a classification of each airspace included in the first aeronautical navigation chart).

The electronic device 100 may be configured to dynamically update aeronautical navigation information displayed at the display device 120 based on a context (e.g., a current location, a travelling direction, the VFR flight plan data 144, etc.) of the aircraft and based on the aeronautical chart data 148. For example, after departing from the first airport associated with the point of origin, the electronic device 100 may be configured to display aeronautical navigation information associated with an airspace surrounding the first airport at the display device 120. As the aircraft navigates along a particular VFR flight route from the first airport towards the second airport, the electronic device 100 may update the aeronautical navigation information displayed at the display device 120. The aeronautical chart data 148 may include information associated with a transmission frequency used by a transmitter of an airport (e.g., the second airport). As the aircraft travels closer to the airport, the electronic device 100 may monitor or scan for transmissions (e.g., messages) from the transmitter via the wireless receiver 130 using the transmission frequency. When the aircraft is within a threshold distance (e.g., a transmission range of the transmitter) of the airport, the wireless receiver 130 may detect transmissions sent from the transmitter associated with airport. The transmissions may include VFR data. The VFR data may include wind speed data, wind direction data, runway data, path of approach data, active runway data, information indicating whether pilots are to use a left-handed approach or a right-handed approach when approaching the runway, information indicating an amount of precipitation, information indicating a dew point, or a combination thereof. The VFR data may include information generated based on local environmental conditions (e.g., wind speed, wind direction, precipitation information, etc.) detected by sensors and other systems located at the airport or proximate to the airport. The VFR data may also include information generated by external systems and sensors (e.g., a national weather service) that is received at the airport via a network (e.g., the internet).

The electronic device 100 may be configured to determine a suggested path of approach to a runway of the second airport based on the VFR data. An illustrative embodiment of determining a suggested path of approach to a runway of an airport based on VFR data received from a transmitter associated with the airport is described with reference to FIG. 2. The electronic device 100 may determine the suggested path of approach based on the VFR data received from the transmitter of the airport and/or other sources of information. For example, the wireless receiver 130 of the electronic device 100 may receive a notice to airmen (NOTAM) message indicating a potential hazard along a particular flight route or at a particular location. In an embodiment, the electronic device 100 may be configured to determine the suggested path of approach to be used by the pilot when navigating the aircraft to the runway of the second airport under VFR based at least in part on the NOTAM message.

As another example, an airport (e.g., the second airport) may include an air traffic control system, and the wireless receiver 130 may receive information from the air traffic control system. The information received from the air traffic control system may include wind speed data, wind direction data, runway data, path of approach data, active runway data, information indicating whether pilots are to use a left-handed approach or a right-handed approach when approaching the runway, information indicating an amount of precipitation, information indicating a dew point, or a combination thereof. The VFR data may include information generated based on local environmental conditions (e.g., wind speed, wind direction, precipitation information, etc.) detected by sensors and other systems located at the second airport or proximate to the second airport. In an embodiment, the electronic device 100 may be configured to determine the suggested path of approach to be used by the pilot when navigating the aircraft to the runway of the second airport under VFR based at least in part on the information received from the air traffic control system. The electronic device 100 may be configured to determine the suggested path of approach to be used by the pilot when navigating the aircraft to the runway of the second airport under VFR based on the VFR data, the NOTAM message, the information received from the air traffic control system, information received from other systems, or a combination of these information sources.

In response to determining the suggested path of approach to be used by the pilot when navigating the aircraft to the runway of the second airport under VFR, the electronic device 100 may be configured to highlight (or otherwise emphasize) a representation of the suggested path of approach at the display device 120. Non-limiting and illustrative embodiments of highlighting the representation of the suggested path of approach at the display device 120 are described below. Although specific exemplary and illustrative embodiments of highlighting the representation of the suggested path of approach at the display device 120 are described with reference to FIGS. 1-8, an electronic device according to the present disclosure may be configured to highlight (or otherwise emphasize) a representation of a suggested path of approach at a display device in another manner such that the representation of the suggested path of approach, when displayed at the display device, is visible or more clearly visible to the pilot.

In a particular embodiment, highlighting the representation of the suggested path of approach from may include changing a color of the representation of the suggested path of approach. For example, the aeronautical navigational information displayed at the display device 120 may include representations of a first path of approach to the runway, a second path of approach to the runway, and a third path of approach to the runway. The first path of approach, the second path of approach, and the third path of approach may be initially represented at the display device 120 as lines having a first color (e.g., black). The electronic device 100 may determine, based on the VFR data (and/or other information sources), that the second path of approach is to be used by the pilot to navigate the aircraft to the runway and may highlight the second path of approach by changing the color of the representation (e.g., the line) of the second path of approach from the first color (e.g., black) to a second color (e.g., blue). In another example, the electronic device 100 may be configured to highlight the second path of approach by outlining the representation of the second path of approach in a second color (e.g., blue). In another example, the electronic device 100 may be configured to highlight the second path of approach by changing the color of the representations (e.g., the lines) of the first path of approach and the third path of approach from the first color to a different color (e.g., light gray). In another example, the electronic device 100 may be configured to highlight the second path of approach by outlining the representations (e.g., the lines) of the first path of approach and the third path of approach in a different color (e.g., light gray). In yet another example, the electronic device 100 may be configured to highlight the second path of approach by changing a color of the representation of the second path of approach (or an outline of the representation of the second path of approach) and by changing a color of the representations of the first path of approach and the third path of approach (or an outline of the representations of the first path of approach and the third path of approach).

In an additional or alternative embodiment, the electronic device 100 may be configured to highlight the second path of approach by modifying a characteristic of one or more of the representations of paths of approach included in the aeronautical navigational information displayed at the display device 120. For example, the first path of approach, the second path of approach, and the third path of approach may be represented as lines within the aeronautical navigational information displayed at the display device 120, and changing the characteristic of a representation of a particular path of approach may include modifying a thickness of a line representing the particular path of approach. An illustrative embodiment of modifying a characteristic of a representation of a suggested path of approach to a runway of an airport is described with reference to FIG. 3.

In an alternative or additional embodiment, modifying the characteristic may include modifying a pattern of the line used to represent the particular path of approach. For example, the first path of approach, the second path of approach, and the third path of approach may initially be represented by dashed lines within the aeronautical navigational information displayed at the display device 120 and changing the characteristic of the representation of the particular path of approach may include changing the line representing the particular path of approach from a dashed line to a solid line. Alternatively, the first path of approach, the second path of approach, and the third path of approach may initially be represented within the aeronautical navigational information by solid lines and changing the characteristic of the representation of the particular path of approach may include changing the line representing the particular path of approach from a solid line to a dashed line. A second illustrative embodiment of modifying a characteristic of a representation of a suggested path of approach to runway of an airport is described with reference to FIG. 4.

Alternatively or additionally, modifying the characteristic may include modifying a translucency of the lines used to represent the first path of approach, the second path of approach, the third path of approach, or a combination thereof. For example, the first path of approach, the second path of approach, and the third path of approach may initially be represented by opaque (non-translucent) lines, and modifying the characteristic may include modifying translucency of the first path of approach and the third path of approach such that the first path of approach and the third path of approach displayed at the display device 120 are translucent (e.g., transparent or semi-transparent).

Alternatively of in addition to highlighting the suggested path of approach to be used by the pilot to navigate the aircraft to the runway of the second airport (e.g., the airport 220 of FIG. 2), the electronic device 100 may be configured to modify the representations of the paths of approach that are not to be used by the pilot to navigate the aircraft to the runway of the second airport. In an embodiment, modifying the representations may include removing the representations of the other paths of approach from the aeronautical navigation chart displayed at the display device 120. A third illustrative embodiment of highlighting a representation of a suggested path of approach to a runway of an airport by modifying representations of other paths of approach is described with reference to FIG. 5.

The aeronautical navigational information displayed at the display device 120 may include representations of landmarks and other topographical features. The representations of the landmarks and the other topographical features may enable the pilot to identify reference points that may assist the pilot in navigating the aircraft along a particular path (e.g., a VFR flight route, a path of approach to a runway, etc.). In an embodiment, the electronic device 100 may be configured to determine one or more reference points (e.g., one or more landmarks or topographical features) associated with the suggested path of approach to be used by the pilot when navigating the aircraft to the runway of the airport. An illustrative embodiment of determining one or more reference points associated with a suggested path of approach to be used by a pilot when navigating an aircraft to a runway of an airport is described with reference to FIG. 6.

In response to determining the reference points, the electronic device 100 may be configured to highlight (or otherwise emphasize) the landmarks and the other topographical features that may be relevant to the pilot when navigating the aircraft to the runway of the airport under VFR. For example, a color of a line used to represent a particular landmark or other topographical feature within the aeronautical navigational information displayed at the display device 120 may be changed to or outlined in a second color. Alternatively or additionally, a thickness of the line used to represent the particular landmark or the other topographical feature may be changed. In an alternative or additional embodiment, the electronic device 100 may be configured to remove or de-emphasize representations of landmarks and/or other topographical features that may not be relevant to the pilot when navigating the aircraft to the runway of the airport under VFR. An illustrative embodiment of highlighting one or more reference points associated with a suggested path of approach to be used by a pilot when navigating an aircraft to a runway of an airport is described with reference to FIG. 7.

In an embodiment, the electronic device 100 may be configured to highlight (or otherwise emphasize) the representation of the suggested path of approach and/or the representations of the landmarks and the other topographical features using a combination of the above described techniques and/or other techniques. For example, the electronic device 100 may highlight the representation of the suggested path of approach to be used by the pilot when navigating the aircraft to the runway of the airport under VFR by changing a color of the representation of the suggested path of approach from a first color to a second color, by changing a characteristic of the representation (e.g., a thickness or a pattern of a line, a transparency or translucency of the line) of the suggested path of approach, or both. As another example, the electronic device 100 may highlight the suggested path of approach to be used by the pilot when navigating the aircraft to the runway of the airport under VFR by removing or de-emphasizing the representations of the other paths of approach and by removing or de-emphasizing representations of landmarks and other topographical features that may not aid the pilot in navigating the aircraft along the suggested path of approach. Highlighting (e.g., changing a color of or a characteristic of) a representation of a suggested path of approach to be used by a pilot when navigating an aircraft to a runway of an airport under VFR may enable the pilot to locate the suggested path of approach within aeronautical navigational information displayed at a display device more quickly and may also enable the pilot to spend more time scanning for other aircraft and obstructions (e.g., radio towers, etc.) that may be present in an airspace surrounding the airport. Additionally, highlighting landmarks and/or topographical features relevant to the suggested path of approach to be used by the pilot when navigating the aircraft to the runway of the airport under VFR may enable the pilot to more quickly identify the landmarks and/or topographical features that may be used to navigate the aircraft along the suggested path of approach and to more quickly identify the landmarks and/or the topographical features when scanning the ground below the aircraft.

In an embodiment, after highlighting the representation of the suggested path of approach on the aeronautical navigational information displayed at the display device 120, the electronic device 100 may receive an input indicating a selection of the highlighted representation of the suggested path of approach. In an embodiment, the display device 120 may be a touch screen display device and the input may be received via the touch screen (e.g., the pilot may touch the highlighted representation of the suggested path of approach on the display device 120). In another embodiment, the input may be received via an input device (e.g., a control on a control panel of the aircraft, or a peripheral device) that is coupled to the electronic device 100. In an embodiment, the electronic device 100 may modify the representations of the other paths of approach (e.g., removing the other representations, changing a characteristic or color of the other representations, etc.) included in the aeronautical navigational information displayed at the display device 120 in response to receiving the input indicating the selection of the highlighted representation of the suggested path of approach.

In an embodiment, the electronic device 100 may present an override command button (not shown in FIG. 1) as a graphical overlay on the aeronautical navigational information displayed at the display device 120. The override command button may be selected by the pilot of the aircraft to override the highlighted path of approach determined by the electronic device 100. To illustrate, as the pilot navigates the aircraft along the highlighted path of approach towards the runway of the airport, the pilot may notice (either visually or through radio communications) that other pilots in the airspace are landing other aircraft at the runway in a manner that contradicts the VFR data received from the transmitter of the airport. For example, the VFR data received from the transmitter of the airport may indicate that the wind direction is west-to-east and that the landing direction is east-to-west (e.g., aircraft are to land at the runway while travelling west into the wind). Upon noticing that the other aircraft are landing at the runway from the west (i.e., while travelling with the wind), the pilot of the aircraft may select the override command button to modify the suggested path of approach to be used by the pilot when navigating the aircraft to the runway of the airport under VFR.

In response to selection of the override command button, the electronic device 100 may generate an input indicating that the pilot of the aircraft is overriding the highlighted path of approach and may enable the pilot to select an alternative path of approach for use in navigating the aircraft to the runway under VFR. When the override command button is selected, the electronic device 100 may highlight one or more representations of alternative paths of approach that the pilot may use to navigate the aircraft to the runway of the airport under VFR. Alternatively or additionally, the pilot may select (e.g., using a touch screen interface of the display device 120) the representation of the alternative path of approach from among the representations of the other paths of approach included in the aeronautical navigational information displayed at the display device 120. In response to the selection of the alternative path of approach, the electronic device 100 may update the aeronautical navigational information displayed at the display device 120 to highlight (or otherwise emphasize) the alternative path of approach. In an embodiment, the electronic device 100 may also highlight (or otherwise emphasize) landmarks and/or other topographical features relevant to navigating the aircraft along the alternative path of approach under VFR. In an embodiment, highlighting the particular alternative path of approach may include changing a color of the representation of the particular alternative path of approach, changing a characteristic the representation of the particular alternative path of approach, changing a color of other representations of paths of approach (i.e., representations other than the particular alternative path of approach), changing a characteristic the representations of the other paths of approach, changing a color of representations of landmarks and/or topographical features relevant to the particular alternative path of approach, changing a characteristic the representation of the landmarks and/or the topographical features relevant to the particular alternative path of approach, or a combination thereof.

By enabling the pilot to modify the path of approach to be used when navigating the aircraft to the runway of the airport, the electronic device 100 may enable the pilot to adapt quickly to changes in flight conditions that may not be detected using navigation data (e.g., the VFR data received from the transmitter of the airport, the VFR flight plan data 144, the aeronautical chart data 148, NOTAM messages, air traffic controller messages, etc.). Additionally, by updating (e.g., highlighting) the aeronautical navigation information displayed at the display device 120 based on the alternative path of approach (determined in response to the override command), the electronic device 100 may enable the pilot of the aircraft to quickly locate landmarks and/or topographical features that may be used to navigate the aircraft to the alternative path of approach under VFR and to implement maneuvers to navigate the aircraft to the runway along the alternative path of approach under VFR.

Figure 2:
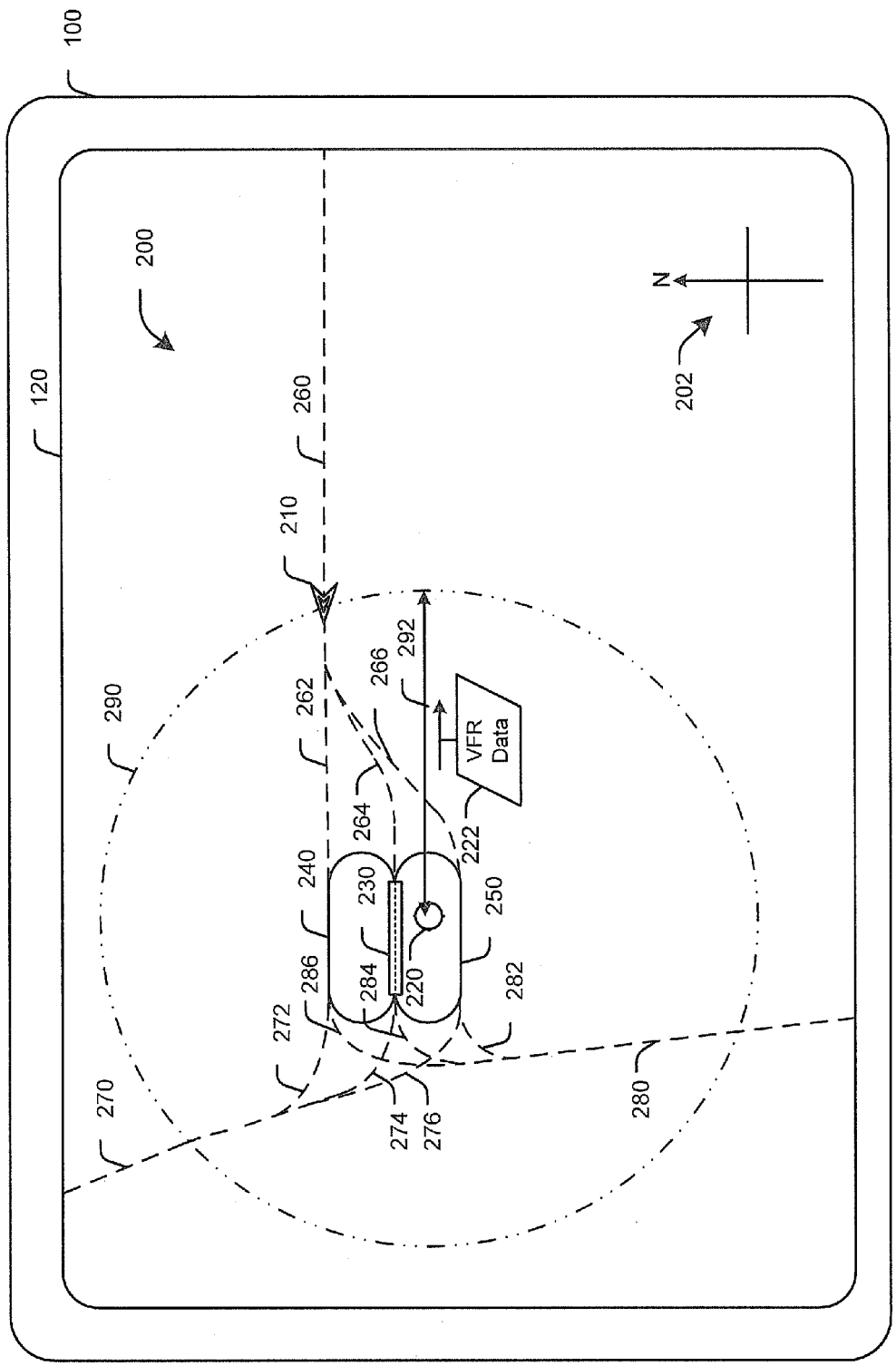
FIG. 2 is an illustrative embodiment of an electronic device for displaying aeronautical navigation information at a display device and for dynamically determining a suggested path of approach to an airport.

Referring to FIG. 2, an illustrative embodiment of an electronic device for displaying aeronautical navigation information at a display device and for dynamically determining a suggested path of approach to an airport is shown. In FIG. 2, the electronic device 100 and the display device 120 of FIG. 1 are shown. In FIG. 2, aeronautical navigation information 200 (e.g., an aeronautical navigation chart) is displayed at the display device 120. The aeronautical navigation information 200 is associated with an airspace surrounding an airport 220.

In FIG. 2, a compass rose 202 and a representation of a communication range 290 of a transmitter (not shown in FIG. 2) associated with the airport 220 are shown. As shown in FIG. 2, the communication range 290 may have a transmission radius 292. The transmitter may be configured to generate and transmit (e.g., broadcast) VFR data 222. The VFR data 222 may include wind speed data, wind direction data, runway data, path of approach data, active runway data, information indicating whether pilots are to use a left-handed approach or a right-handed approach when approaching the runway, information indicating an amount of precipitation, information indicating a dew point, or a combination thereof. It is noted that the compass rose 202 and the representation of the communication range 290 having the transmission radius 292 may not be displayed at the display device 120 and are illustrated in FIG. 2 for simplicity of description.

As shown in FIG. 2, the aeronautical navigation information 200 includes a representation of an aircraft 210, a representation of an airport 220 having a runway 230, a first approach pattern 240, a second approach pattern 250, and VFR flight routes 260, 270, 280. The VFR flight routes 260, 270, 280 may correspond to VFR flight routes that may be used to navigate the aircraft 210 from a point of origin (not shown in FIG. 2) to the runway 230 of the airport 220. In FIG. 2, the aircraft 210 is shown travelling west along the VFR flight route 260 and is within the communication range 290 of the transmitter of the airport 220. Thus, the wireless receiver 130 of the electronic device 100 may detect transmission of and may receive the VFR data 222.

As shown in FIG. 2, each of the VFR flight routes 260, 270, 280 may include multiple paths of approach to the runway 230. The VFR flight route 260 includes a first path of approach 262, a second path of approach 264, and a third path of approach 264. The VFR flight route 270 includes a fourth path of approach 272, a fifth path of approach 274, and a sixth path of approach 276. The VFR flight route 280 includes a seventh path of approach 282, an eighth path of approach 284, and a ninth path of approach 286. The electronic device 100 may determine a particular one of the paths of approach 262, 264, 266, 272, 274, 276, 282, 284, 286 that the aircraft 210 is to use based on the VFR data 222, based on VFR flight plan data (e.g., the VFR flight plan data 144 of FIG. 1), other navigation data (e.g., global positioning system (GPS) data indicating a position of the aircraft 210, environmental information, etc.), or a combination of information sources.

To illustrate, the electronic device 100 may determine, based on the VFR flight plan data 144, that the aircraft 210 is travelling along the VFR flight route 260. The VFR data 222 may indicate that an active landing direction for the runway 230 is east-to-west (e.g., right-to-left in FIG. 2 as indicated by the compass rose 202). The electronic device 100 may determine, based on the active landing direction indicated by the VFR data 222, that the aircraft 210 is to use the second path of approach 264 to approach and land at the runway 230. In response to determining that the aircraft 210 is to use the second path of approach 264, the electronic device 100 may highlight (or otherwise emphasize) the representation of the second path of approach 264 at the display device 120, as described with reference to FIGS. 3 and 4. Additionally or alternatively, in response to determining that the aircraft 210 is to use the second path of approach 264, the electronic device 100 may modify the representations of the other paths of approach 262, 266, 272, 274, 276, 282, 284, 286, as described with reference to FIGS. 1 and 5.

As another illustrative example, the VFR data 222 may indicate that the active landing direction for the runway 230 is west-to-east (e.g., left-to-right in FIG. 2 as indicated by the compass rose 202). As illustrated in FIG. 2, the pilot may land the aircraft 210 at the runway 230 from the west by navigating the aircraft 210 along the first path of approach 262 and the first approach pattern 240 or by navigating the aircraft 210 along the third path of approach 266 and the second approach pattern 250. The electronic device 100 may determine whether to highlight the first path of approach 262 and the first approach pattern 240 or to highlight the third path of approach 266 and the second approach pattern 250 based on whether the VFR data 222 indicates that the pilot is to use a left-handed approach (e.g., using only left-hand tunas) or a right-handed (e.g., using only right-hand turns) approach when landing the aircraft 210 at the runway 230. When the VFR data 222 indicates that the pilot is to use the left-handed approach, the electronic device 100 may determine that the aircraft 210 is to use the first path of approach 262 and the first approach pattern 240 to land the aircraft 210 at the runway 230 and may highlight (or otherwise emphasize) the first path of approach 262 and the first approach pattern 240. When the VFR data 222 indicates that the pilot is to use the right-handed approach, the electronic device 100 may determine that the aircraft 210 is to use the path of approach 266 and the second approach pattern 250 to land the aircraft 210 at the runway 230 and may highlight (or otherwise emphasize) the representations of the third path of approach 266 and the second approach pattern 250.

In yet another illustrative example, the aircraft 210 may be travelling along the VFR flight route 270 rather than the VFR flight route 260. The VFR data 222 may indicate that an active landing direction for the runway 230 is west-to-east (e.g., left-to-right in FIG. 2 as indicated by the compass rose 202). The electronic device 100 may determine, based on the VFR flight plan data 144, that the aircraft 210 is travelling along the VFR flight route 270 and that the pilot is to navigate the aircraft 210 along the fifth path of approach 274 when landing the aircraft 210 at the runway 230 and may highlight (or otherwise emphasize) the representation of the fifth path of approach 274. Alternatively, the VFR data 222 may indicate that an active landing direction for the runway 230 is east-to-west (e.g., right-to-left in FIG. 2 as indicated by the compass rose 202). The electronic device 100 may determine that the aircraft 210 is travelling along the VFR flight route 270 and that the pilot may land the aircraft 210 at the runway 230 from the east by navigating the aircraft 210 along the fourth path of approach 272 and the first approach pattern 240 or by navigating the aircraft 210 along the sixth path of approach 276 and the second approach pattern 250. When the VFR data 222 indicates that the pilot is to use the left-handed approach, the electronic device 100 may determine that the pilot is to land the aircraft 210 at the runway 230 from the east by navigating the aircraft 210 along the sixth path of approach 276 and the second approach pattern 250 and may highlight (or otherwise emphasize) the representations of the sixth path of approach 276 and the second approach pattern 250. When the VFR data 222 indicates that the pilot is to use the right-handed approach, the electronic device 100 may determine that the pilot is to land the aircraft 210 at the runway 230 by navigating the aircraft 210 along the fourth path of approach 272 and the first approach pattern 240 and may highlight (or otherwise emphasize) the representations of the fourth path of approach 272 and the first approach pattern 240.

In yet another illustrative example, the aircraft 210 may be travelling along the VFR flight route 280 rather than the VFR flight route 260. The VFR data 222 may indicate that an active landing direction for the runway 230 is west-to-east (e.g., left-to-right in FIG. 2 as indicated by the compass rose 202). The electronic device 100 may determine that the aircraft 210 is travelling along the VFR flight route 280 and that the pilot may land the aircraft 210 at the runway 230 from the west by navigating the aircraft 210 along the eighth path of approach 284 and may highlight (or otherwise emphasize) the representation of the eighth path of approach 284. Alternatively, the VFR data 222 may indicate that an active landing direction for the runway 230 is east-to-west (e.g., right-to-left in FIG. 2 as indicated by the compass rose 202). The electronic device 100 may determine that the aircraft 210 is travelling along the VFR flight route 280 and that the pilot may land the aircraft 210 at the runway 230 from the east by navigating the aircraft 210 along the seventh path of approach 282 and the second approach pattern 250 or by navigating the aircraft 210 along the ninth path of approach 286 and the first approach pattern 240. When the VFR data 222 indicates that the pilot is to use the left-handed approach, the electronic device 100 may determine that pilot is to land the aircraft 210 at the runway 230 from the east by navigating the aircraft 210 along the seventh path of approach 282 and the second approach pattern 250 and may highlight (or otherwise emphasize) the representations of the seventh path of approach 282 and the second approach pattern 250. When the VFR data 222 indicates that the aircraft 210 is to use the right-handed approach, the electronic device 100 may determine that pilot is to land the aircraft 210 at the runway 230 from the east by navigating the aircraft 210 along the ninth path of approach 286 and the first approach pattern 240 and may highlight (or otherwise emphasize) the representations of the ninth path of approach 286 and the first approach pattern 240.

In an embodiment, the VFR data 222 may not indicate the landing direction and the electronic device 100 may be configured to determine the landing direction based on information included in the VFR data 222 (e.g., a wind direction). For example, aircraft are typically landed on a runway while travelling into the wind (e.g., travelling in direction that is opposite to a direction than the wind is travelling) when possible. The electronic device 100 may be configured to determine a landing direction to be used by the pilot when landing the aircraft at the runway 230 of the airport 220 based on the wind direction data included in the VFR data 222. As another example, some airports may have multiple runways (e.g., two runways) and one of the multiple runways may be designated as an active runway (e.g., a runway that may be used to land the aircraft 210 at the runway 230 of the airport 220). The electronic device 100 may be configured to determine a particular runway of the multiple runways that is to be used by the pilot when landing the aircraft 210.

Figure 3:
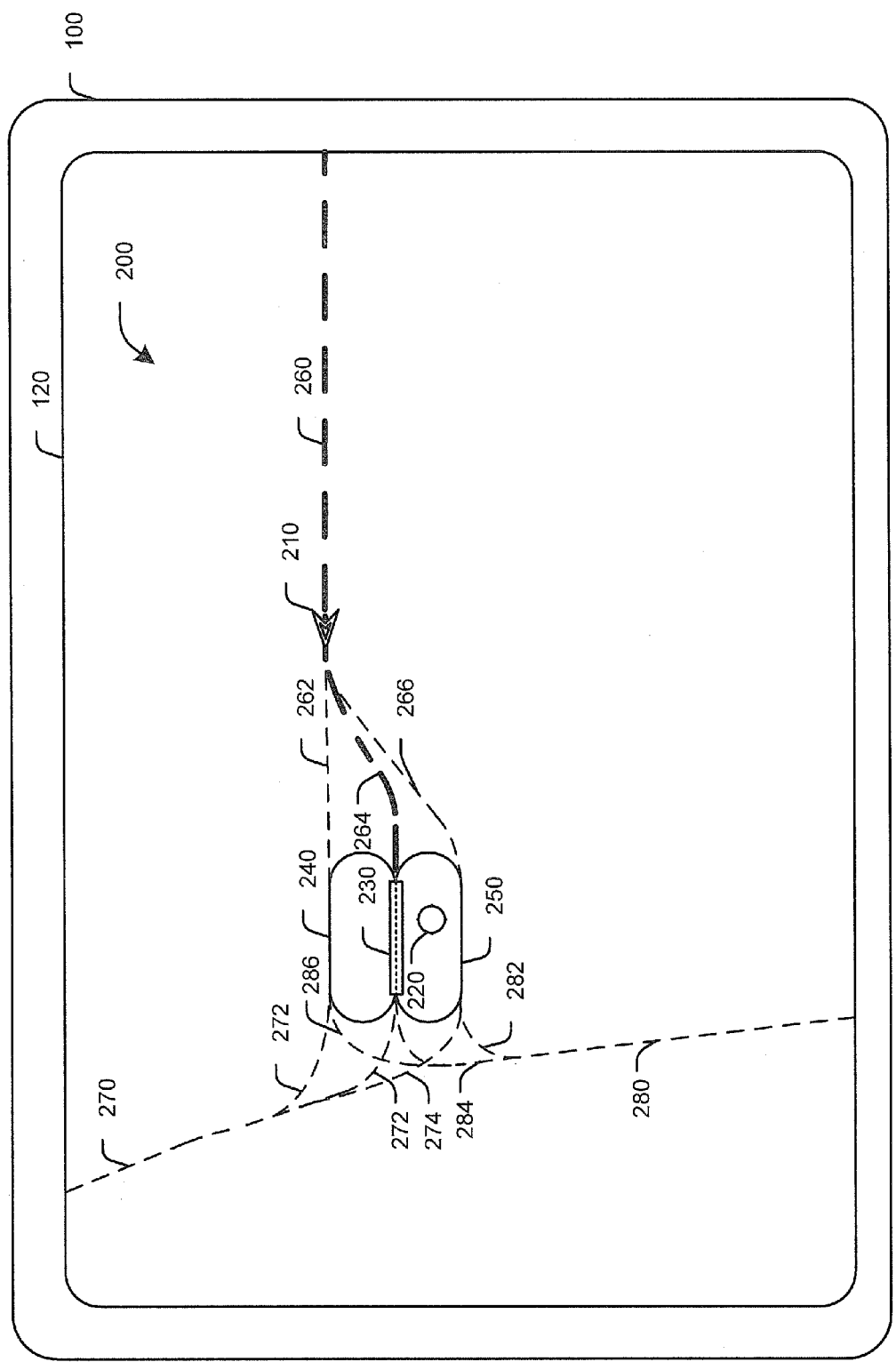
FIG. 3 is an illustrative embodiment of highlighting a representation of a suggested path of approach to runway of an airport.

Referring to FIG. 3, an illustrative embodiment of highlighting a representation of a suggested path of approach to runway of an airport is shown. In FIG. 3, the electronic device 100 and the display device 120 of FIG. 1 are shown. As shown in FIG. 3, the aeronautical navigation information 200 of FIG. 2 is displayed at the display device 120, and the representation of the second path of approach 264 has been highlighted by changing a thickness of the line used to represent the second path of approach 264. Highlighting (e.g., changing a color of or a characteristic of) a representation of a suggested path of approach to be used by a pilot when navigating an aircraft to a runway of an airport under VFR may enable the pilot to locate the suggested path of approach within aeronautical navigational information displayed at a display device more quickly and may enable the pilot to spend more time scanning for other aircraft and obstructions (e.g., radio towers, etc.) that may be present in an airspace surrounding the airport.

Figure 4:
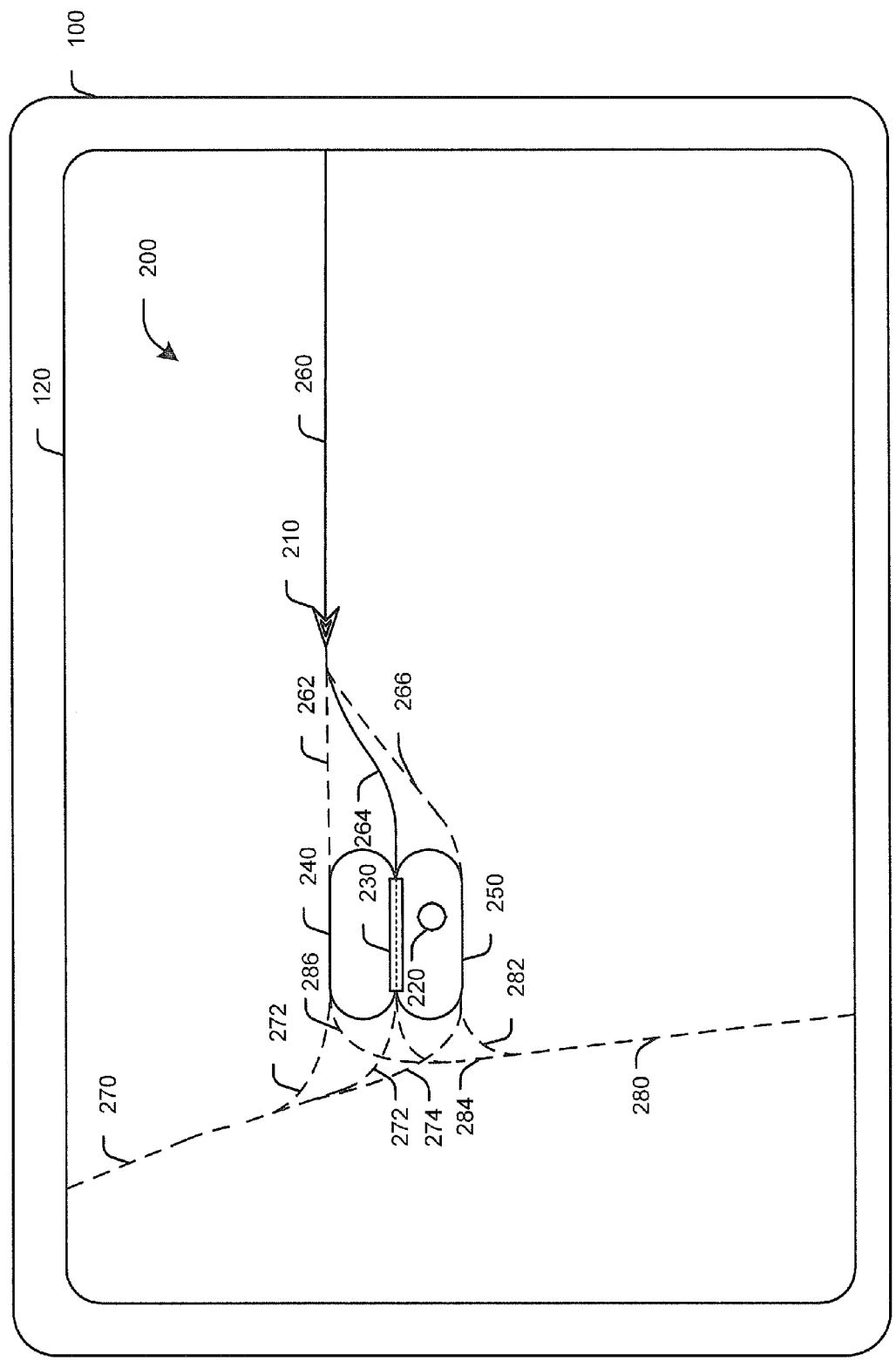
FIG. 4 is a second illustrative embodiment of highlighting a representation of a suggested path of approach to runway of an airport.

Referring to FIG. 4, a second illustrative embodiment of highlighting a representation of a suggested path of approach to runway of an airport is shown. In FIG. 4, the electronic device 100 and the display device 120 of FIG. 1 are shown. As shown in FIG. 4, the aeronautical navigation information 200 of FIG. 2 is displayed at the display device 120, and the representation of the second path of approach 264 has been highlighted by changing the representation of the second path of approach 264 from a dashed line to a solid line. Highlighting (e.g., changing a color of or a characteristic of) a representation of a suggested path of approach to be used by a pilot when navigating an aircraft to a runway of an airport under VFR may enable the pilot to locate the suggested path of approach within aeronautical navigational information displayed at a display device more quickly and may enable the pilot to spend more time scanning for other aircraft and obstructions (e.g., radio towers, etc.) that may be present in an airspace surrounding the airport.

Figure 5:
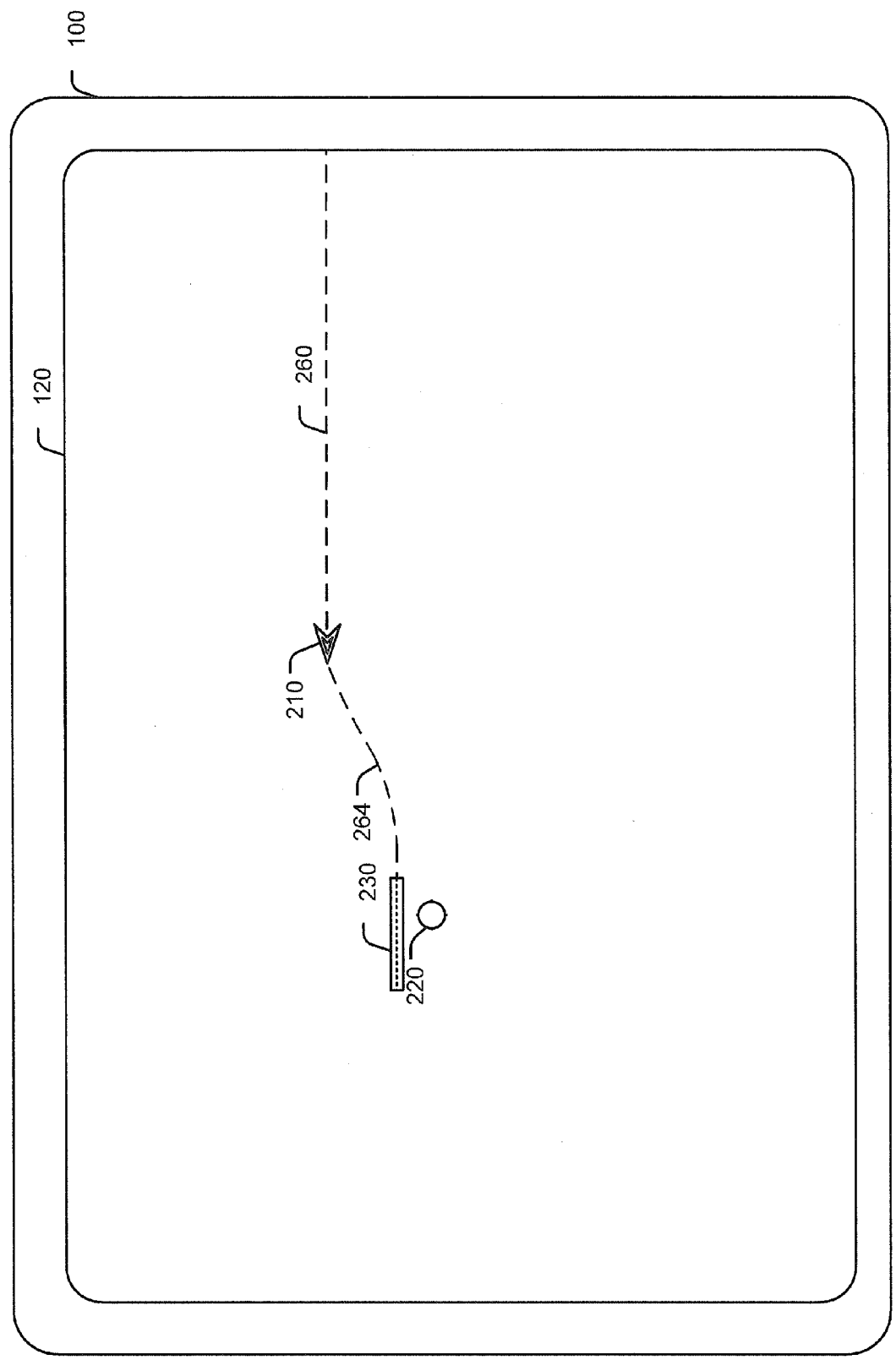
FIG. 5 is a third illustrative embodiment of highlighting a representation of a suggested path of approach to runway of an airport.

Referring to FIG. 5, a third illustrative embodiment of highlighting a representation of a suggested path of approach to runway of an airport is shown. In FIG. 5, the electronic device 100 and the display device 120 of FIG. 1 are shown. As shown in FIG. 5, the aeronautical navigation information 200 of FIG. 2 is displayed at the display device 120, and the second path of approach 264 has been highlighted (or otherwise emphasized) by removing (or otherwise de-emphasizing) the representations of the paths of approach 262, 266, 272, 274, 276, 282, 284, 286 from the aeronautical navigation information 200 displayed at the display device 120. Additionally, the second path of approach 264 has been highlighted (or otherwise emphasized) by removing the representations of the first approach pattern 240 and the second approach pattern 250 from the aeronautical navigation information 200 displayed at the display device 120. Highlighting (e.g., changing a color of or a characteristic of) a representation of a suggested path of approach to be used by a pilot when navigating an aircraft to a runway of an airport under VFR may enable the pilot to locate the suggested path of approach within aeronautical navigational information displayed at a display device more quickly and may also enable the pilot to spend more time scanning for other aircraft and obstructions (e.g., radio towers, etc.) that may be present in an airspace surrounding the airport.

Figure 6:
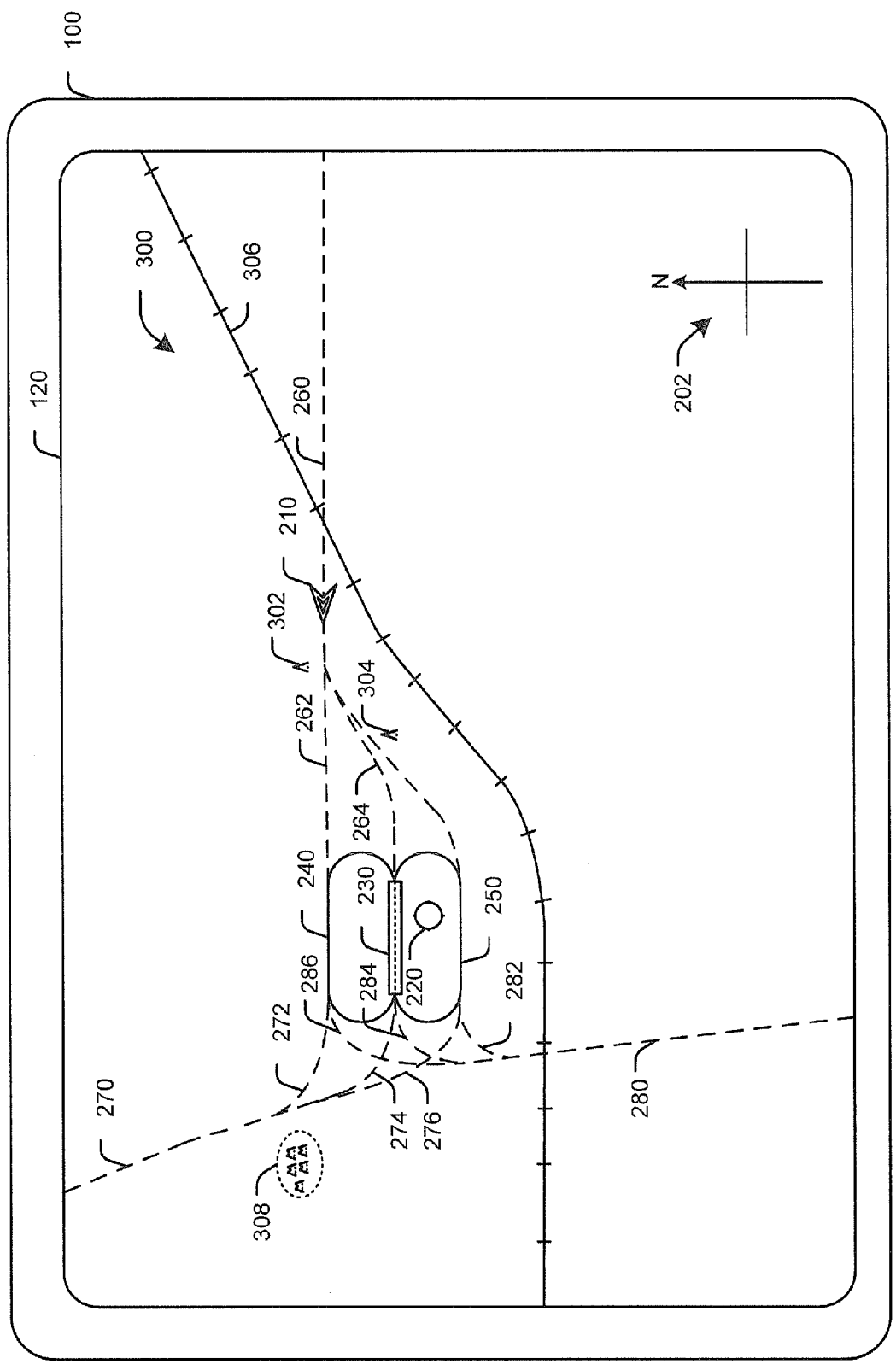
FIG. 6 is an illustrative embodiment of determining one or more reference points associated with a suggested path of approach to be used by a pilot when navigating an aircraft to a runway of an airport.

Referring to FIG. 6, an illustrative embodiment of determining one or more reference points associated with a suggested path of approach to be used by a pilot when navigating an aircraft to a runway of an airport is shown. In FIG. 6, the electronic device 100 and the display device 120 of FIG. 1 are shown. In FIG. 6, aeronautical navigation information 300 is displayed at the display device 120. The aeronautical navigation information 300 includes all of the information included in the aeronautical navigation information 200 of FIG. 2 and additionally includes representations of landmarks and topographical features. For example, the aeronautical navigation information 300 includes a representation of a first landmark 302 (e.g., a radio tower), a representation of a second landmark 304 (e.g., a second radio tower), a representation of a topographical feature 306 (e.g., a railroad), and a representation of a third landmark 308 (e.g., a windmill farm).

As described with reference to FIGS. 1-5, the electronic device 100 may determine that the pilot is to navigate the aircraft 210 to the runway 230 of the airport 220 using the second path of approach 264. In response to determining that the pilot is to navigate the aircraft 210 to the runway 230 of the airport 220 using the second path of approach 264, the electronic device 100 may determine one or more reference points (e.g., one or more of the landmarks 302, 304, 308 and the topographical features 306) associated with the second path of approach 264. For example, as shown in FIG. 6, the second path of approach 264 turns away from the VFR flight route 260 when the aircraft 210 reaches a point along the VFR flight route 260 that is approximately south of the first landmark 302. When the pilot reaches the point along the VFR flight route 260 that is approximately south of the first landmark 302, the pilot should initiate a maneuver to navigate the aircraft 210 southwest and onto the second path of approach 264. Thus, the electronic device 100 may determine that the first landmark 302 may be relevant to the pilot when navigating the aircraft 210 along the second path of approach 264.

Additionally, the electronic device 100 may determine that the second landmark 304 may be relevant to the pilot when navigating the aircraft 210 along the second path of approach 264. For example, as can be seen in FIG. 6, the second landmark 304 may be approximately east of the runway 230. When the pilot is navigating the aircraft 210 along the second path of approach 264, the pilot may initiate a maneuver to begin aligning the aircraft 210 with the runway 230 prior to the aircraft 210 being positioned between the runway 230 and the second landmark 304. The electronic device 100 may determine that the third landmark 308 may not be relevant (e.g., may not serve as a visual reference point) to the pilot when navigating the aircraft 210 along the second path of approach 264. An illustrative embodiment of highlighting (or otherwise emphasizing) representations of one or more reference points associated with a suggested path of approach to be used by a pilot when navigating an aircraft to a runway of an airport is described with reference to FIG. 7.

Figure 7:
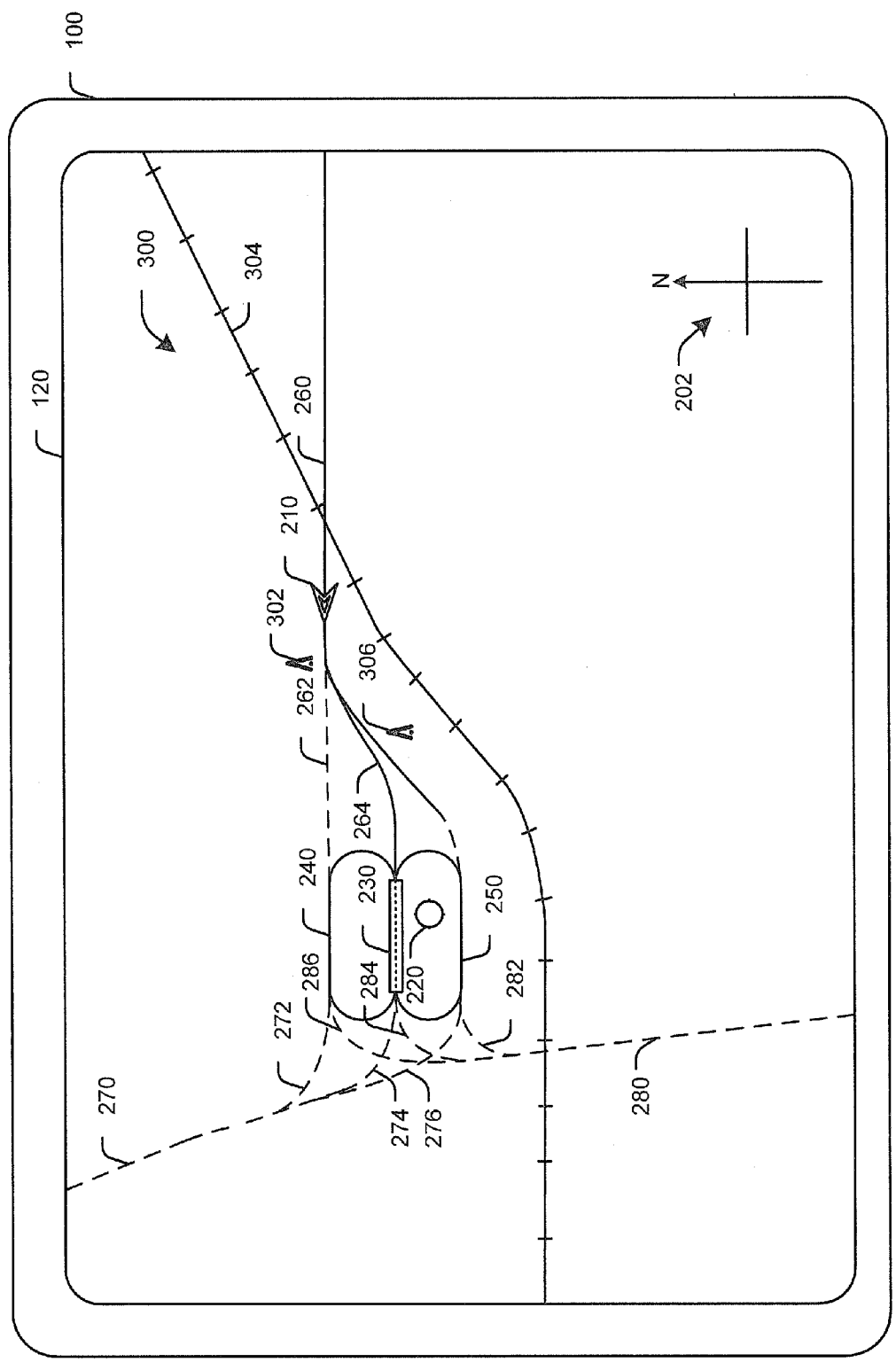
FIG. 7 is an illustrative embodiment of highlighting representations of one or more reference points associated with a suggested path of approach to be used by a pilot when navigating an aircraft to a runway of an airport.

Referring to FIG. 7, an illustrative embodiment of highlighting representations of one or more reference points associated with a suggested path of approach to be used by a pilot when navigating an aircraft to a runway of an airport is shown. In FIG. 7, the electronic device 100 and the display device 120 of FIG. 1 are shown. In FIG. 7, the aeronautical navigation information 300 of FIG. 6 is displayed at the display device 120, and the representation of the second path of approach 264 has been highlighted (or otherwise emphasized) by changing a characteristic (e.g., a pattern of the line) of the representation of the second path of approach 264, as described with reference to FIG. 4. As shown, in FIG. 7, a characteristic (e.g., a thickness) of the lines used to represent the first landmark 302 and the second landmark 306 has been changed. Additionally, the representation of the third landmark 308 has been removed from the aeronautical navigation information 300. In an embodiment, the representations of the paths of approach 262, 266, 272, 274, 276, 282, 284, 286, the representations of the first approach pattern 240 and the second approach pattern 250, and the VFR flight routes 270, 280 may also be removed from the display device 120, as described with reference to FIG. 5.

Highlighting (or otherwise emphasizing) representations of the reference points included in the aeronautical navigation information displayed at a display device may enable the pilot to more quickly identify landmarks and other topographical features that may be used by the pilot when navigating the aircraft to the runway of the airport along a determined path of approach. Further, highlighting (or otherwise emphasizing) the reference points may enable the pilot to more quickly identify the landmarks and/or the topographical features that may be used to navigate the aircraft along the suggested path of approach and to more quickly identify the landmarks and/or the topographical features when scanning the ground below the aircraft.

Figure 8:
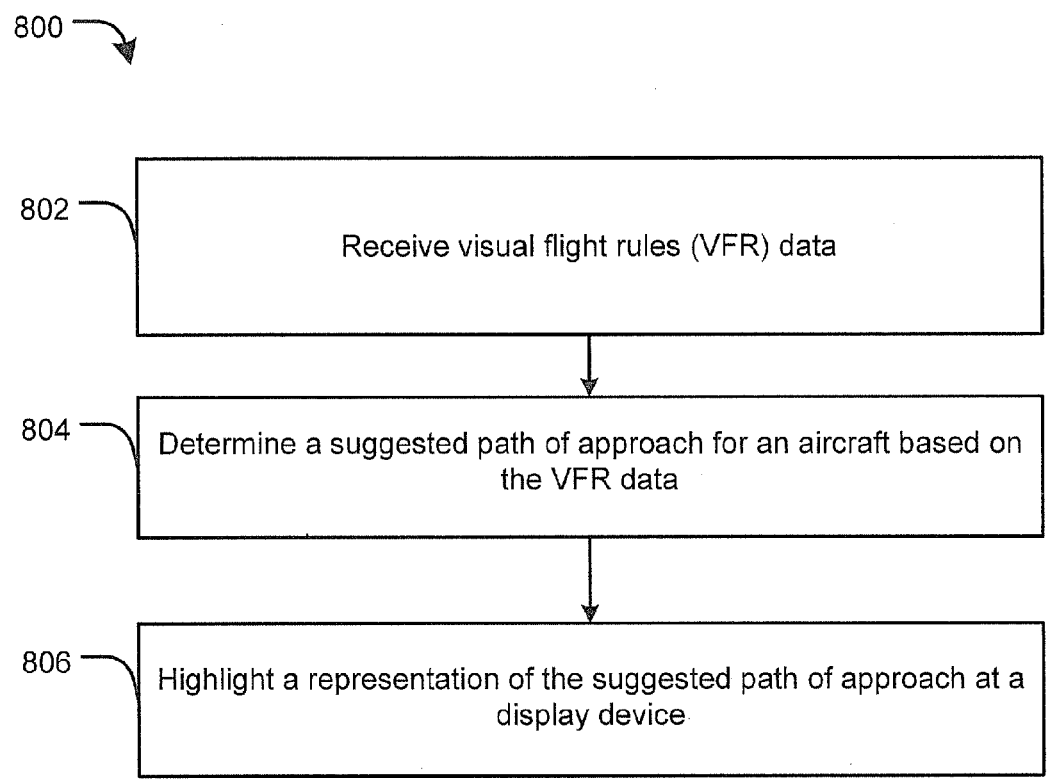
FIG. 8 is a flowchart of an embodiment of a method of determining a suggested path of approach for an aircraft to an airport based on VFR data at an electronic device and highlighting a representation of the suggested path of approach at a display of the electronic device.

Referring to FIG. 8, a flowchart of an embodiment of a method of determining a suggested path of approach for an aircraft to an airport based on VFR data received at an electronic device and highlighting a representation of the suggested path of approach at a display of the electronic device is shown and designated 800. At 802, the method 800 includes receiving VFR data at an electronic device. In an embodiment, the electronic device may be the electronic device 100 described with reference to FIGS. 1-7, and the VFR data may be the VFR data 222 described with reference to FIG. 2. In an embodiment, the VFR data may include navigation information received from one or more information sources (e.g., information received from a transmitter of an airport, NOTAM messages, GPS information, etc.). At 804, the method 800 includes determining a suggested path of approach for an aircraft based on the VFR data. The suggested path of approach may correspond to a flight path of an aircraft to a runway of an airport using VFR. At 806, the method 800 includes highlighting a representation of the suggested path of approach at a display of the electronic device. In an embodiment, highlighting the representation of the suggested path of approach may include changing a color of the representation of the suggested path of approach, changing a characteristic of the suggested path of approach, changing a color of representations of one or more other paths of approach, changing a characteristic of the representations of the one or more other paths of approach, removing the representations of the one or more other paths of approach, changing a color of representations of one or more landmarks and/or topographical features, removing the representations of the one or more landmarks and/or topographical features, or a combination thereof.

Figure 9:
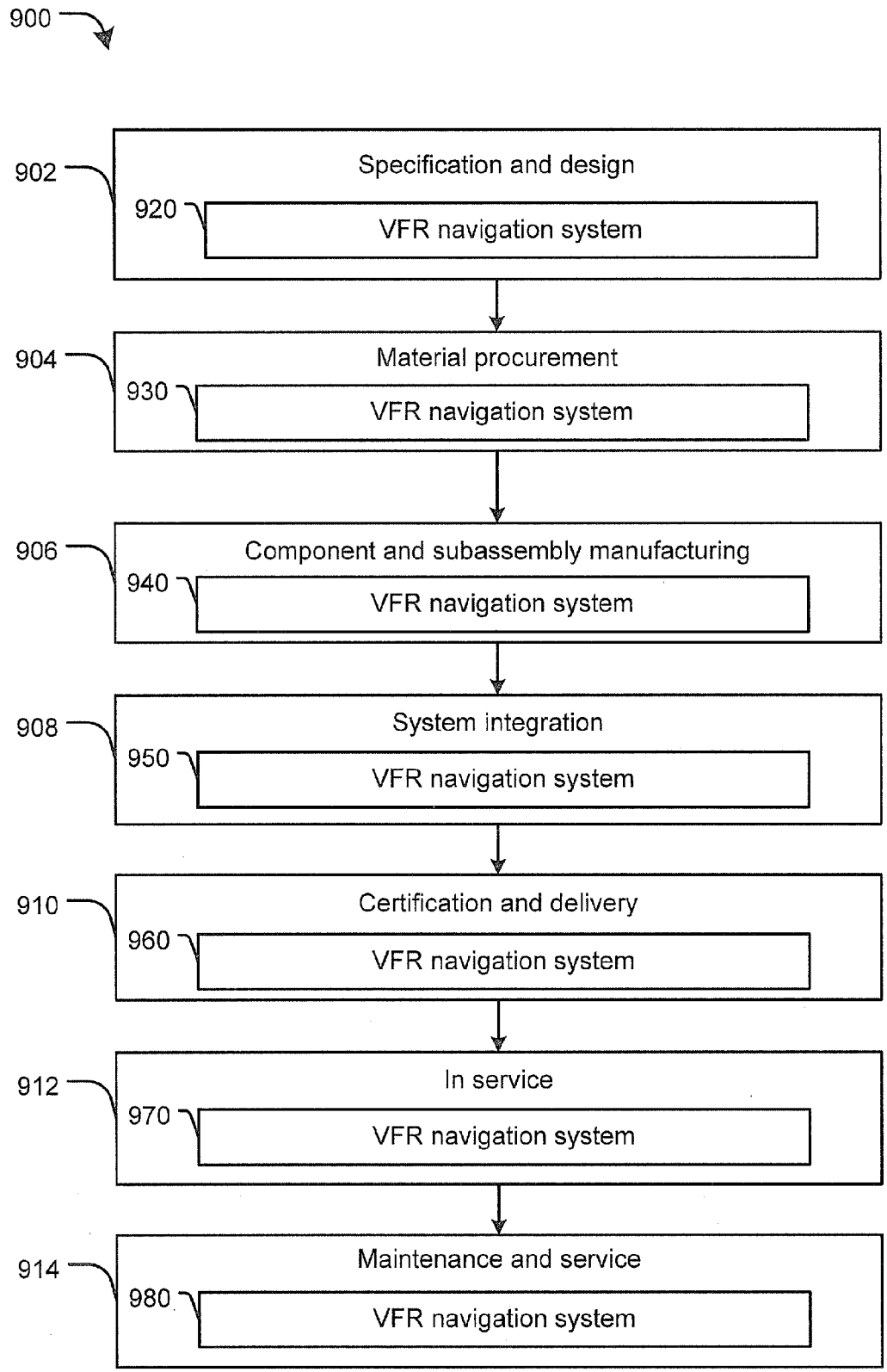
FIG. 9 is a flowchart illustrative of a life cycle of an aircraft that includes a visual flight rules (VFR) navigation system according to one or more of the embodiments described with reference to FIGS. 1-8.

Referring to FIG. 9, a flowchart illustrative of a life cycle of an aircraft that includes a visual flight rules (VFR) navigation system according to one or more of the embodiments described with reference to FIGS. 1-8 is shown and designated 900. During pre-production, the exemplary method 900 includes, at 902, specification and design of an aircraft, such as an aircraft 1002 described with reference to FIG. 10 or the aircraft 210 described with reference to FIGS. 2-7. During specification and design of the aircraft, the method 900 may include, at 920, specification and design of a VFR navigation system, such as the electronic device 100 of FIG. 1. At 904, the method 900 includes material procurement. At 930, the method 900 includes procuring materials (e.g., processing components, display devices, wireless receivers, memory devices, standalone devices such as a tablet, etc.) for the VFR navigation system.

During production, the method 900 includes, at 906, component and subassembly manufacturing and, at 908, system integration of the aircraft. The method 900 may include, at 940, component and subassembly manufacturing (e.g., assembling and testing the VFR navigation system) of the VFR navigation system and, at 950, system integration (e.g., integrating the VFR navigation system into the aircraft) of the VFR navigation system. At 910, the method 900 includes certification and delivery of the aircraft and, at 912, placing the aircraft in service. Certification and delivery may include, at 960, training a pilot to use the VFR navigation system. At 970, the method 900 includes placing the VFR navigation system in service. While in service by a customer, the aircraft 1002 may be scheduled for routine maintenance and service (which may also include modification, reconfiguration, refurbishment, and so on). At 914, the method 900 includes performing maintenance and service on the aircraft. At 980, the method 900 includes performing maintenance and service of the VFR navigation system. For example, maintenance and service of the VFR navigation system which may include updating aeronautical chart data stored at a memory of the VFR navigation system, replacing components (e.g., processors, memory devices, display devices, etc.), and other operations.

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 10:
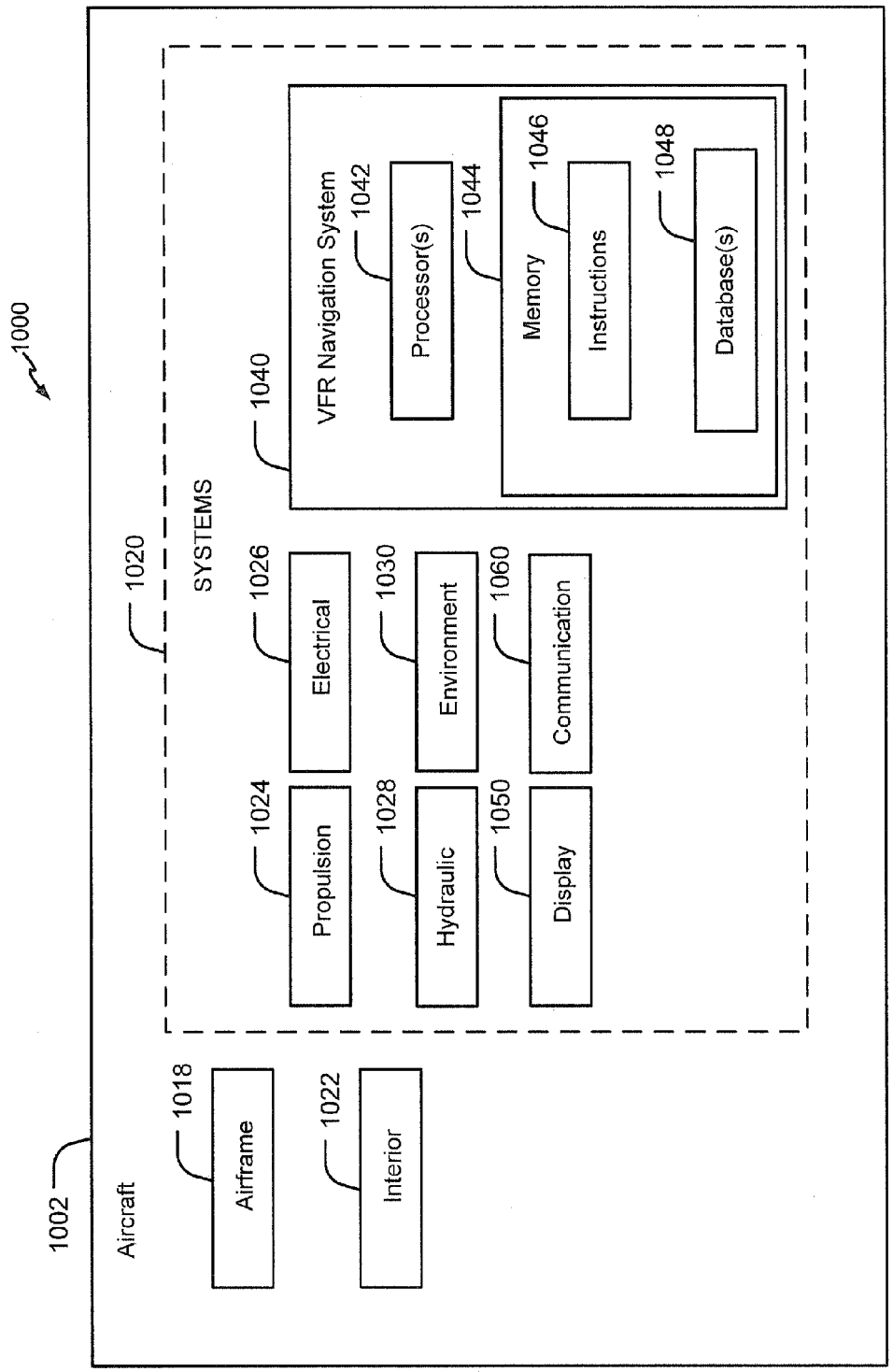
FIG. 10 is a block diagram of an illustrative embodiment of an aircraft that includes a visual flight rules (VFR) navigation system according to one or more of the embodiments described with reference to FIGS. 1-8.

Referring to FIG. 10, a block diagram of an illustrative embodiment of an aircraft that includes a visual flight rules (VFR) navigation system according to one or more of the embodiments described with reference to FIGS. 1-8 is shown and designated 1000. As shown in FIG. 10, the aircraft 1002 produced by the method 900 may include an airframe 1018 with a plurality of systems 1020 and an interior 1022. Examples of high-level systems that may be included in the plurality of systems 1020 include one or more of a propulsion system 1024, an electrical system 1026, a hydraulic system 1028, an environmental system 1030, a display system 1050, and a communication 1060 (e.g., a radio communication system). The display system 1050 may include one or more display devices (e.g., the display device 120 of FIG. 1). The VFR navigation system 1040 may be coupled to the display system 1050 and may be configured to display aeronautical navigation information (e.g., the aeronautical navigation information 200 of FIG. 2 and the aeronautical navigation information 300 of FIG. 3) at one or more of the display devices of the display system 1050. Additionally, the VFR navigation system 1040 may be coupled to other systems, such as one or more of the plurality of systems 1020. In a particular embodiment, the VFR navigation system 1040 may be the electronic device 100 described with reference to FIGS. 1-7. The VFR navigation system 1040 may include a processor 1042 and a memory 1044 (e.g., the memory 140 of FIG. 1). The memory 1044 may include instructions 1046 (e.g., the instructions 150 of FIG. 1) that are executable by the processor 1042 to perform the operations described with reference to FIGS. 1-8. The memory 1044 may include a database(s) 1048. In an embodiment, the database(s) 1048 may include the VFR flight rules 142 of FIG. 1, the VFR flight plan data 144 of FIG. 1, the restriction data 146 of FIG. 1, the aeronautical chart data 148 of FIG. 1, or a combination thereof. The VFR navigation system 1040 may be used to determine and highlight a suggested path of approach to be used by a pilot of the aircraft 1002 when navigating the aircraft 1002 to a runway of an airport as described with reference to FIGS. 1-8. Any number of other systems may be included.

Apparatus and methods embodied herein may be employed during any one or more of the stages of the production and service method 900. For example, components or subassemblies corresponding to production process 908 may be fabricated or manufactured in a manner similar to components or subassemblies produced while the aircraft 1002 is in service, at 912. Also, one or more apparatus embodiments, method embodiments, or a combination thereof may be utilized during the production stages (e.g., elements 902-910 of the method 900), for example, by substantially expediting assembly of or reducing the cost of the aircraft 1002. Similarly, one or more of apparatus embodiments, method embodiments, or a combination thereof may be utilized while the aircraft 1002 is in service, at 912, for example and without limitation, to maintenance and service, at 914.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may have been grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
   receiving, at an electronic device of an aircraft from an aviation weather system of an airport, weather related data as first data;
   receiving, at the electronic device from a sensor of the aircraft, navigation data as second data;
   receiving, at the electronic device from a sensor located at the airport or proximate to the airport, local environmental conditions of the airport as third data;
   displaying, at a display device of the electronic device and based on visual flight rules (VFR) chart data, aeronautical navigation information including graphical representations of a plurality of VFR paths of approach of a VFR flight route while the aircraft is traveling on the VFR flight route and is being navigated using VFR;
   dynamically determining a suggested VFR path of approach of the plurality of VFR paths of approach for the aircraft based on the first data, the second data, and the third data, wherein the plurality of VFR paths of approach correspond to multiple VFR flight paths of the aircraft to a runway of the airport;
   dynamically highlighting, at the display device, a first graphical representation of the graphical representations, the first graphical representation corresponding to the suggested VFR path of approach;
   displaying a first visual navigation reference point, an aircraft graphical representation associated with the aircraft, and an airport graphical representation associated with the airport at the display device, wherein the first visual navigation reference point is associated with the suggested VFR path, and wherein the first visual navigation reference point is distinct from the aircraft graphical representation and the airport graphical representation;

receiving an input at the electronic device; and in response to receiving the input, highlighting a particular representation of a second VFR path of approach of the plurality of VFR paths of approach while displaying the suggested VFR path of approach, wherein the particular representation of the second VFR path of approach corresponds to a second VFR flight path of the aircraft to the runway of the airport, wherein the second VFR flight path is distinct from the suggested VFR path of approach.

2. The method of claim 1, further comprising:

receiving, from a user, an input indicating a selection of the first graphical representation; and in response to receiving the input from the user, modifying representations of other VFR paths of approach of the plurality of VFR paths of approach presented at the display device.

3. The method of claim 2, wherein modifying the representations of the other VFR paths of approach includes removing the representations of the other VFR paths of approach from the display device.

4. The method of claim 1, further comprising:

determining that the aircraft has entered restricted airspace based on restriction data; and in response to determining that the aircraft has entered the restricted airspace, generating an alert.

5. The method of claim 4, wherein the restricted airspace corresponds to airspace restricted to instrument flight rules navigation.

6. The method of claim 1, wherein the navigation data includes global positioning system (GPS) data indicating a position of the aircraft, environmental data, aeronautical chart data, flight plan data associated with a flight plan of the aircraft, or a combination thereof.

7. The method of claim 6, wherein the suggested VFR path of approach is determined based on the navigation data.

8. The method of claim 1, wherein the electronic device includes a memory that stores aeronautical chart data, wherein the aeronautical chart data includes information associated with a transmission frequency used by a transmitter of the airport, wherein the aeronautical chart data is transmitted from the airport using the transmitter, and further comprising detecting the transmission of the aeronautical chart data based on the information associated with the transmission frequency of the transmitter of the airport.

9. The method of claim 1, wherein the first visual navigation reference point is a landmark, topographical feature, or a combination thereof.

10. The method of claim 1, further comprising displaying a second navigation reference point that is not associated with the suggested VFR path of approach.

11. The method of claim 1, wherein dynamically highlighting the first graphical representation includes highlighting the first visual navigation reference point.

12. An apparatus comprising:

a processor; and a memory coupled to the processor, the memory storing instructions that, when executed by the processor, cause the processor to:

receive, from an aviation weather system of an airport, weather related data as first data;

receive, from a sensor of an aircraft, navigation data as second data;

receive, from a sensor located at the airport or proximate to the airport, local environmental conditions of the airport as third data;

display, at a display device communicatively coupled to the processor and based on visual flight rules (VFR) chart data, graphical representations of a plurality of VFR paths of approach of a VFR flight route while the aircraft is traveling on the VFR flight route and is being navigated using VFR;

dynamically determine a suggested VFR path of approach for the aircraft based on the first data, the second data, and the third data, wherein the plurality of VFR paths of approach correspond to multiple VFR flight paths of the aircraft to a runway of the airport;

dynamically highlight an existing representation of the suggested VFR path of approach at the display device;

display a first visual navigation reference point, an aircraft graphical representation associated with the aircraft, and an airport graphical representation associated with the airport at the display device, wherein the first visual navigation reference point is associated with the suggested VFR path, and wherein the first visual navigation reference point is distinct from the aircraft graphical representation and the airport graphical representation;

receiving an input; and in response to receiving the input, highlighting a particular representation of a second VFR path of approach of the plurality of VFR paths of approach while displaying the suggested VFR path of approach, wherein the particular representation of the second VFR path of approach corresponds to a second VFR flight path of the aircraft to the runway of the airport, wherein the second VFR flight path is distinct from the suggested VFR path of approach.

13. The apparatus of claim 12, wherein the memory includes flight plan data associated with a flight plan of the aircraft, and wherein the memory includes instructions that, when executed by the processor, cause the processor to determine the suggested VFR path of approach for the aircraft based at least in part on the flight plan data.

14. The apparatus of claim 12, wherein the memory includes instructions that, when executed by the processor, cause the processor to:

receive an input indicating a selection of the representation of the suggested VFR path of approach; and modify representations of other paths of approach of the plurality of VFR paths of approach presented at the display device.

15. The apparatus of claim 12, wherein the instructions, when executed by the processor, further cause the processor to determine the first visual navigation reference point while the aircraft is approaching the airport.

16. The apparatus of claim 12, wherein the memory includes aeronautical chart data, wherein the aeronautical chart data includes information associated with a transmission frequency used by a transmitter of the airport.

17. A non-transitory computer-readable storage device storing instructions that, when executed by a processor, cause the processor to:

receive, from an aviation weather system of an airport, weather related data as first data;

receive, from a sensor of an aircraft, navigation data as second data;

receive, from a sensor located at the airport or proximate to the airport, local enviromnental conditions of the airport as third data;
display, at a display device communicatively coupled to the processor and based on visual flight rules (VFR) chart data, graphical representations of a plurality of VFR paths of approach of a VFR flight route while the aircraft is traveling on the VFR flight route and is being navigated using VFR;
dynamically determine a suggested VFR path of approach for the aircraft based on the first data, the second data, and the third data, wherein the plurality of VFR paths of approach correspond to multiple VFR flight paths of the aircraft to a runway of the airport;
dynamically highlight a representation of the suggested VFR path of approach at the display device;
display a first visual navigation reference point, an aircraft graphical representation associated with the aircraft, and an airport graphical representation associated with the airport at the display device, wherein the first visual navigation reference point is associated with the suggested VFR path, and wherein the first visual navigation reference point is distinct from the aircraft graphical representation and the airport graphical representation;
receive an input; and
in response to receiving the input, highlight a particular representation of a second VFR path of approach of the plurality of VFR paths of approach while displaying the suggested VFR path of approach, wherein the particular representation of the second VFR path of approach corresponds to a second VFR flight path of the aircraft to the runway of the airport, wherein the second VFR flight path is distinct from the suggested VFR path of approach.

18. The non-transitory computer-readable storage device of claim 17, further comprising instructions that, when executed by the processor, cause the processor to:
receive an input indicating a selection of the representation of the suggested VFR path of approach; and
modify representations of other paths of approach of the plurality of VFR paths of approach presented at the display device.

19. The non-transitory computer-readable storage device of claim 18, wherein modifying the representations of the other paths of approach includes changing a color of the representations of the other paths of approach presented at the display device.

20. The non-transitory computer-readable storage device of claim 17, wherein the first data indicates an active path of approach to the runway of the airport.

* * * * *